United States Patent [19]

McKnight et al.

[11] Patent Number: 5,062,105

[45] Date of Patent: Oct. 29, 1991

[54] PROGRAMMABLE MULTIPLEXING TECHNIQUES FOR MAPPING A CAPACITY DOMAIN INTO A TIME DOMAIN WITHIN A FRAME

[75] Inventors: Richard R. McKnight, Wheaton, Ill.; Michael L. Steinberger, Colts Neck, N.J.

[73] Assignee: AT&T Bell Laboratories, Murray Hill, N.J.

[21] Appl. No.: 459,929

[22] Filed: Jan. 2, 1990

[51] Int. Cl.$^5$ ............................................. H04J 3/04
[52] U.S. Cl. ...................................... 370/84; 370/112
[58] Field of Search ................. 370/84, 112, 38.1, 102

[56] References Cited

U.S. PATENT DOCUMENTS

| | | | |
|---|---|---|---|
| 3,632,882 | 1/1972 | Ciecierski et al. | 370/84 |
| 4,156,796 | 5/1979 | O'Neal et al. | 178/3 |
| 4,188,665 | 2/1980 | Nagel et al. | 364/200 |
| 4,204,093 | 5/1980 | Yeh | 370/95 |
| 4,322,844 | 5/1982 | Fellinger et al. | 370/64 |
| 4,330,689 | 5/1982 | Kang et al. | 179/15.55 |
| 4,383,316 | 5/1983 | Seidel | 370/118 |
| 4,409,683 | 10/1983 | Woodward | 370/112 |
| 4,558,445 | 12/1985 | Novick | 370/84 |
| 4,617,659 | 10/1986 | Chopping et al. | 370/100 |
| 4,744,082 | 5/1988 | Fujimura et al. | 370/102 |

OTHER PUBLICATIONS

Manes, Proc 1978 Ultrasonics Symposium, Cherry Hill, N.J., pp. 549–552.

Ekelund et al., Ericsson Review, vol. 65, No. 3, Mar. 1988, pp. 122–128.

Primary Examiner—Benedict V. Safourek
Assistant Examiner—Dang Ton
Attorney, Agent, or Firm—Barry H. Freedman

[57] ABSTRACT

Method and apparatus are disclosed for a programmable multiplexer for converting each of one or more input data signals, with individual data rates, into a second higher data rate signal by mapping contiguously arbitarily assigned Capacity Time Slots (CTSs) in a capacity domain frame to Time Slots in a Time Domain frame (TDTSs) so the TDTSs for each input signal are substantially uniformly spread throughout the TD frame. The programmable multiplexer receives separate input data rate signals which are clock synchronized to the multiplexer clock from separate synchronizers, and maps the capacity domain of the input signals to the time frame format using a 2-step or 3-step digit reverse technique. Both techniques decompose the capacity domain address into predetermined digits from predetermined number bases and then combine the digits to perform a similar computation using the number bases in reverse order. The 3-step technique uses an intermediate step of translating the initially determined values for each the predetermined digits using a bit reversal technique.

11 Claims, 7 Drawing Sheets

TABLE 1

NUMBER BASES: $X_1 = 2$, $X_2 = 3$, $X_3 = 5$ $X = X_1 \bullet 3 \bullet 5 + X_2 \bullet 5 + X_3 \quad X_3 \; 3 \bullet 2 + X_2 \; 2 + X_1 = Y$

| X | $X_1$ | $X_2$ | $X_3$ | $X_3$ | $X_2$ | $X_1$ | Y |
|---|---|---|---|---|---|---|---|
| 00 | 0 | 0 | 0 | 0 | 0 | 0 | 0 |
| 01 | 0 | 0 | 1 | 1 | 0 | 0 | 6 |
| 02 | 0 | 0 | 2 | 2 | 0 | 0 | 12 |
| 03 | 0 | 0 | 3 | 3 | 0 | 0 | 18 |
| 04 | 0 | 0 | 4 | 4 | 0 | 0 | 24 |
| 05 | 0 | 1 | 0 | 0 | 1 | 0 | 2 |
| 06 | 0 | 1 | 1 | 1 | 1 | 0 | 8 |
| 07 | 0 | 1 | 2 | 2 | 1 | 0 | 14 |
| 08 | 0 | 1 | 3 | 3 | 1 | 0 | 20 |
| 09 | 0 | 1 | 4 | 4 | 1 | 0 | 26 |
| 10 | 0 | 2 | 0 | 0 | 2 | 0 | 4 |
| 11 | 0 | 2 | 1 | 1 | 2 | 0 | 10 |
| 12 | 0 | 2 | 2 | 2 | 2 | 0 | 16 |
| 13 | 0 | 2 | 3 | 3 | 2 | 0 | 22 |
| 14 | 0 | 2 | 4 | 4 | 2 | 0 | 28 |
| 15 | 1 | 0 | 0 | 0 | 0 | 1 | 1 |
| 16 | 1 | 0 | 1 | 1 | 0 | 1 | 7 |
| 17 | 1 | 0 | 2 | 2 | 0 | 1 | 13 |
| 18 | 1 | 0 | 3 | 3 | 0 | 1 | 19 |
| 19 | 1 | 0 | 4 | 4 | 0 | 1 | 25 |
| 20 | 1 | 1 | 0 | 0 | 1 | 1 | 3 |
| 21 | 1 | 1 | 1 | 1 | 1 | 1 | 9 |
| 22 | 1 | 1 | 2 | 2 | 1 | 1 | 15 |
| 23 | 1 | 1 | 3 | 3 | 1 | 1 | 21 |
| 24 | 1 | 1 | 4 | 4 | 1 | 1 | 27 |
| 25 | 1 | 2 | 0 | 0 | 2 | 1 | 5 |
| 26 | 1 | 2 | 1 | 1 | 2 | 1 | 11 |
| 27 | 1 | 2 | 2 | 2 | 2 | 1 | 17 |
| 28 | 1 | 2 | 3 | 3 | 2 | 1 | 23 |
| 29 | 1 | 2 | 4 | 4 | 2 | 1 | 29 |

FIG. 5

TABLE 2

NUMBER BASES: $X_1 = 2$, $X_2 = 3$, $X_3 = 5$

| $X_1$ | $Y_1$ | $X_2$ | $Y_2$ | $X_3$ | $Y_3$ |
|---|---|---|---|---|---|
| 0 | 0 | 0 | 0 | 0 | 0 |
| 1 | 1 | 1 | 2 | 1 | 4 |
|   |   | 2 | 1 | 2 | 2 |
|   |   |   |   | 3 | 3 |
|   |   |   |   | 4 | 1 |

$X = X_1 \bullet 3 \bullet 5 + X_2 \bullet 5 + X_3$    $Y_3 \bullet 3 \bullet 2 + Y_2 \bullet 2 + Y_1 = Y$

| X | $X_1$ | $X_2$ | $X_3$ | $Y_3$ | $Y_2$ | $Y_1$ | Y |
|---|---|---|---|---|---|---|---|
| 00 | 0 | 0 | 0 | 0 | 0 | 0 | 0 |
| 01 | 0 | 0 | 1 | 4 | 0 | 0 | 24 |
| 02 | 0 | 0 | 2 | 2 | 0 | 0 | 12 |
| 03 | 0 | 0 | 3 | 3 | 0 | 0 | 18 |
| 04 | 0 | 0 | 4 | 1 | 0 | 0 | 6 |
| 05 | 0 | 1 | 0 | 0 | 2 | 0 | 4 |
| 06 | 0 | 1 | 1 | 4 | 2 | 0 | 26 |
| 07 | 0 | 1 | 2 | 2 | 2 | 0 | 16 |
| 08 | 0 | 1 | 3 | 3 | 2 | 0 | 22 |
| 09 | 0 | 1 | 4 | 1 | 2 | 0 | 10 |
| 10 | 0 | 2 | 0 | 0 | 1 | 0 | 2 |
| 11 | 0 | 2 | 1 | 4 | 1 | 0 | 26 |
| 12 | 0 | 2 | 2 | 2 | 1 | 0 | 14 |
| 13 | 0 | 2 | 3 | 3 | 1 | 0 | 20 |
| 14 | 0 | 2 | 4 | 1 | 1 | 0 | 8 |
| 15 | 1 | 0 | 0 | 0 | 0 | 1 | 1 |
| 16 | 1 | 0 | 1 | 4 | 0 | 1 | 25 |
| 17 | 1 | 0 | 2 | 2 | 0 | 1 | 13 |
| 18 | 1 | 0 | 3 | 3 | 0 | 1 | 19 |
| 19 | 1 | 0 | 4 | 1 | 0 | 1 | 7 |
| 20 | 1 | 1 | 0 | 0 | 2 | 1 | 5 |
| 21 | 1 | 1 | 1 | 4 | 2 | 1 | 29 |
| 22 | 1 | 1 | 2 | 2 | 2 | 1 | 17 |
| 23 | 1 | 1 | 3 | 3 | 2 | 1 | 23 |
| 24 | 1 | 1 | 4 | 1 | 2 | 1 | 11 |
| 25 | 1 | 2 | 0 | 0 | 1 | 1 | 3 |
| 26 | 1 | 2 | 1 | 4 | 1 | 1 | 27 |
| 27 | 1 | 2 | 2 | 2 | 1 | 1 | 15 |
| 28 | 1 | 2 | 3 | 3 | 1 | 1 | 21 |
| 29 | 1 | 2 | 4 | 1 | 1 | 1 | 9 |

FIG. 7

PROGRAMMABLE MULTIPLEXING TECHNIQUES FOR MAPPING A CAPACITY DOMAIN INTO A TIME DOMAIN WITHIN A FRAME

TECHNICAL FIELD

The present invention relates to programmable multiplexers for implementing a process that permits any one or more first data rate signal to be selectively adapted to a second higher data rate signal in order, for example, to transmit such first data rate signal(s) within a Time Division Multiplexed frame over a commercial communication network operating at the second data rate.

DESCRIPTION OF THE PRIOR ART

In recent years there is a substantial need for communicating with data rates between 10 Mb/s to 1 Gb/s, as, for example, the SONET STS1 51.84 MB/s and SONET STS3 155.52 Mb/s transmission rates, High Definition Television programming at 120 Mb/s or greater, and a Gb/sec supercomputer transmission rate. Such applications cannot directly transmit data messages over existing telecommunications networks because the data rate of the specialized application does not match the data rate used by the existing telecommunication networks. Therefore, to transmit data messages for such applications between remote locations, it becomes necessary to build a separate, specially designed, telecommunication network to link these remote locations. Where such remote locations are spread over wide distances, such as across the United States, the development costs may not justify construction of short or long haul facilities to support each of the different specialized applications.

An alternative solution might be to design specialized data rate converters to meet the criteria of each application. In this regard see, for example, U.S. Pat. No. 4,322,844 issued to F. Fellinger et al. on Mar. 30, 1982, where a transmitter-receiver synchronizer provides bidirectional rate conversion between frames of data having a first rate and a first format, and frames of data having a second rate and a second format. In such synchronizer, a first frame of data at a first rate, and a second frame of data at a second rate are stored in a separate first and second buffer memory, respectively, during a first frame interval, and each frame of data is read out at the other rate during a second frame interval. Additionally, during the second frame interval, a third frame of data at the second rate, and a fourth frame of data at the first rate are read into the first and second buffer memories, respectively, and read out at the other rate during a third frame interval, etc. Another synchronizer is shown in U.S. Pat. No. 4,558,445 issued to L. R. Novick on Dec. 10, 1985 wherein an applique rate converter generates a composite data stream comprising alternate data bits and data boundary bits, and the synchronizer increases such composite stream to the output data rate. Such specialized arrangements are expensive and would require a new design for converting different data rates associated with each different application.

Therefore, the problem remaining in the prior art is to provide a technique that permits specialized applications to economically send their data signals over existing telecommunication networks and thereby avoid constructing expensive specialized long or short haul networks or specialized data rate converters, and provide for a more economic use of the unused capacity of existing networks.

SUMMARY OF THE INVENTION

The foregoing problem in the prior art has been solved in accordance with the present invention which relates to a programmable multiplexer that adapts each of one or more incoming data rate signals to a higher output data rate signal, where each incoming data rate signal comprises the same or a different data rate than found in any one or more of the other incoming data rate signals. The programmable multiplexer then multiplexes such output data rate signals for transmission in a frame of a Time Division Multiplexed (TDM) signal. In operation, the programmable multiplexer defines the capacity domain in which the capacity time slots to be mapped for each input data rate signal occupy contiguous segments, and then maps the capacity time slots into a fixed length time domain digital output transmission frame in a way that the time domain time slots associated with each input signal are nearly uniformly distributed in the digital output transmission frame to complete a mapping from the capacity domain to the time domain.

Other and further aspects of the present invention will become apparent during the course of the following description and by reference to the accompanying drawings.

DETAILED DESCRIPTION

Figure 1:
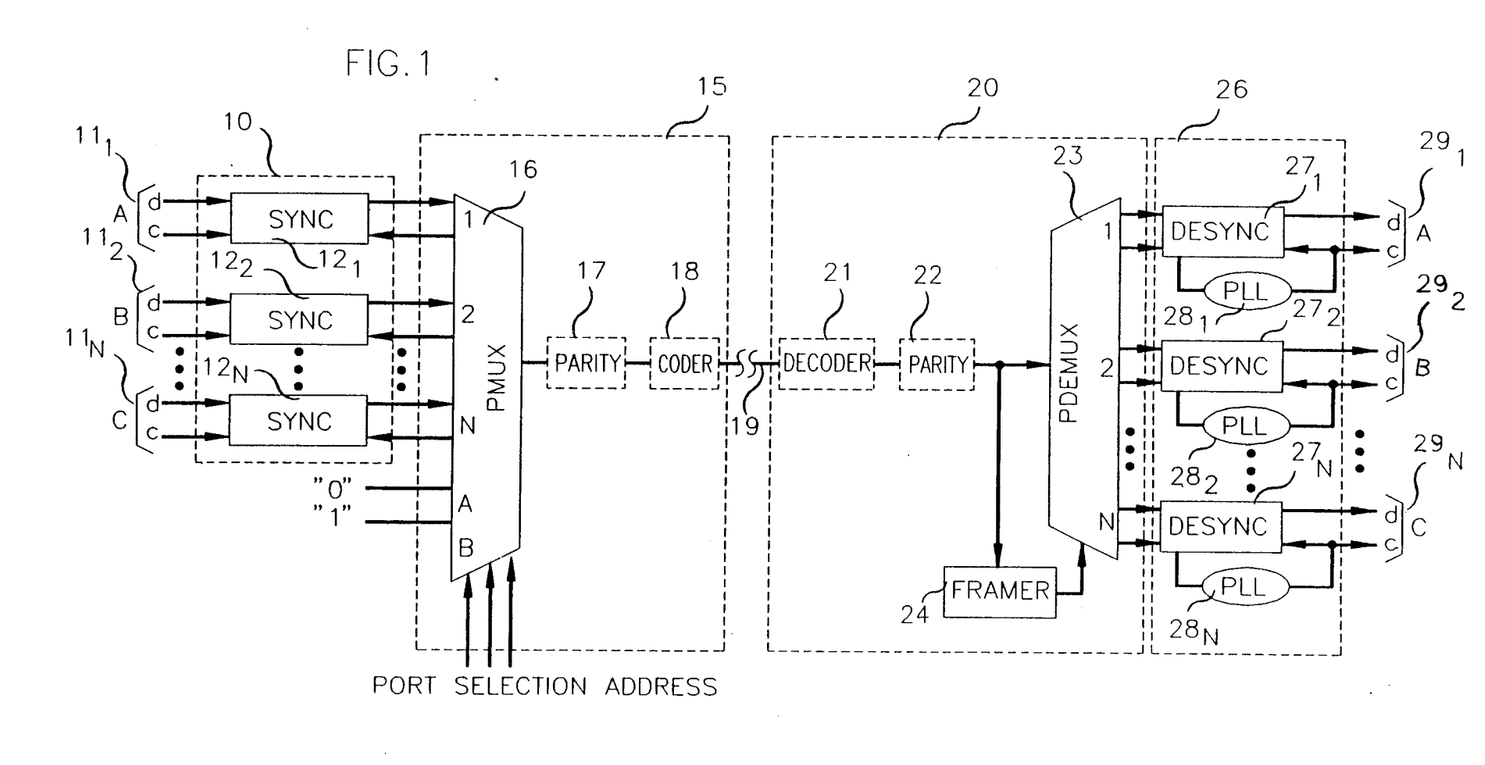
FIG. 1 is a block diagram of an exemplary arrangement of a communication system for practicing the present invention.

FIG. 1 illustrates an exemplary communication system in accordance with the present invention. The transmitting end comprises (1) a Transmit Data Port section 10 including a plurality of N data ports $11_1$ to $11_N$ and a plurality of N synchronizers $12_1$ to $12_N$, where each synchronizer is coupled to a separate one of the data ports 11 for receiving a data "d" and clock "c" signal, and (2) a Multiplexing section 15 comprising (i) a Programmable Multiplexer (PMUX) 16, and an optional Parity Calculator 17 and coder 18 which may be required with certain communication systems only. Programmable Multiplexer 16 comprises exemplary N+A and B input ports, where the N input ports to PMUX 15 are each coupled to a separate one of synchronizers 12 for providing a clock "c" signal to the associated synchronizer 12 and receiving the synchronized data signal, and the exemplary additional A and B ports provide predetermined overhead signals as will be explained in more detail hereinafter. The multiplexed data output signal from Multiplexing section 15 is transmitted via medium 19 to a remote receiving device comprising a Demultiplexing section 20 including an optional decoder 21 and a parity checker 22, which function in the reverse manner of Parity Calculator 17 and coder 18 at the transmitting end, and a Programmable Demultiplexer (PDEMUX) 23 interconnected with a feed-forward framer 24. PDEMUX 23 comprises (1) a single input port for receiving the input multiplexed data signal from medium 19, which may be processed by optional decoder 21 and parity checker 22, and (2) a plurality of N output ports, where PDEMUX 23 functions to separate the received multiplexed signals into separate data "d" and clock "c" paths. In operation, framer 24 detects the exemplary 0-1 frame code and causes PDEMUX 23 to demultiplex the received multiplexed data signal for delivery to the appropriate output ports using, for example, a sequence stored in a RAM of PDEMUX 23 or an address stored in a received packet of data. The N separate data "d" and clock "c" output signals from PDEMUX 23 are transmitted to a Receive Data Port section 26 which comprises (i) a plurality of N desynchronizers $27_1$ to $27_N$, each desynchronizer 27 receiving a separate one of the N "d" and "c" output signals from PDEMUX 23, and (ii) a plurality of N feed-forward Phase Lock Loop (PLL) circuits $28_1$ to $28_N$ which are each associated with a separate one of desynchronizers 27. The "d" and "c" output signals from each of the N desynchronizers $27_1$ to $27_N$ are delivered to separate output ports $29_1$ to $29_N$ of the Receiver Data Port section 26 for transmission to an appropriate separate end user devices.

In each synchronizer 12 of FIG. 1, the clock on exemplary "c" lead from each associated input $11_i$ is synchronized to the clock on the associated exemplary "c" lead from PMUX 16 using any well known technique as, for example, pulse stuffing synchronization. Here, a synchronized frame format containing overhead bits as, for example, fixed frame bits, stuffing bits, stuff indicator bits, parity bits and telemetry are added to the received data. Those overhead bits account for the nominal rate difference between a synchronizer's input and output. Therefore, conventional synchronizers would receive an input data stream with data rate within a predetermined range and generate therefrom a synchronizer output frame which has the same data rate as the other synchronizer output frames. The present synchronizers, however, are programmable to produce a particular data rate output frame and stuff the input data stream up to a rate which is a rational fraction of the output line rate on medium 19. It is to be understood that each of synchronizers 12 can stuff up to any particular fraction of the output line rate on medium 19 as dependent on the capacity of the input signal data rate, where that rational fraction may be the same or a different fraction produced by the other synchronizers. These synchronized data rates are then provided to a separate input of PMUX 16.

Prior art arrangements which appear similar to FIG. 1 include the Transmit Data Port section 10 and a Multiplexing section 15, but use a conventional multiplexer, for PMUX 16, which functions as a commutator interleaver to cyclically interleave data from clock synchronized input ports $11_1$ to $11_N$. As will be described, the present PMUX 16 does not act as a cyclical interleaver but rather functions to map the input capacity domain into an output time domain and provide an N-to-1 digital selector under program control to adaptively interface any first input data rate (e.g., a nonstandard rate) to any second output data rate (e.g., an existing commercial digital transmission network rate). The present PMUX 16 is designed to accept any rate signal presented at its input, provided that the rate is between 3% and 97% of the PMUX output line capacity. Where applications never require reconfiguration, the steps to interface the input and output data rates can be disposed in firmware in the form of a Read-Only Memory (ROM), or if reconfiguration is required to meet different applications, then such steps can be placed in a Random-Access Memory (RAM) of a microprocessor or computer (not shown) associated with PMUX 16. By applying the proper address to PMUX 16 port selection inputs at a given time, any one of the data inputs from synchronizers $12_1$ to $12_N$ can be selected to appear at the output of PMUX 16. Therefore, the output of PMUX 16 is not constrained to the cyclical interleaving of inputs as found in the prior art multiplexers, but can be a pattern of any length.

The ability to implement any interleaving pattern is a first level of programmability and gives rise to a coarse rate-adaptation adjustment where if a particular input port requires, for example, one-half of the output line capacity of PMUX 16, then PMUX 16 can be made to allocate one-half of its output bits or time slots to that input port. Such first level of programmability also gives rise to the ability to create arbitrary frame formats by applying a fixed frame word obtained, for example, from PMUX 16 inputs N+A and B. For example, if input ports A and B provide hardwired "0" and "1" bits, respectively, then a predetermined output frame length can be generated by having PMUX 16 access input ports A and B sequentially to generated a fixed exemplary 0-1 frame word as required. Therefore, the frame format can be conveyed to the PMUX 16 port selection address inputs in the sequence stored in a RAM. The coarse rate adjustment by itself, however, does not allow for a continuous adjustment range since such technique can only produce fixed increments of capacity. The bridging of the gaps between the capacity increments and the actual required input data rates can be performed by synchronizers $12_1$ to $12_N$. That is, synchronizers 12 are designed to include the unique feature of being able to add a variable amount of overhead. Therefore, any required rate differential is accommodated by the fine-tuning procedure of adding the appropriate amount of overhead.

In accordance with the present invention, PMUX 16 uses what will hereinafter be termed a digit reversal technique for developing the interleaving pattern from the capacity domain to the time domain for a specific set of input data rates. The technique is based on the principle that a port 11 should be accessed in substantially even intervals commensurate with its needs. Substantially uniform spacing of the bits from a given data port 11 is desirable to minimize demands on elastic stores within a synchronizer and desynchronizer, as well as to minimize phase noise in the output data clock. The fundamental goal of the digit reversal technique is to provide a mapping from a capacity domain to a time domain.

Figure 2:
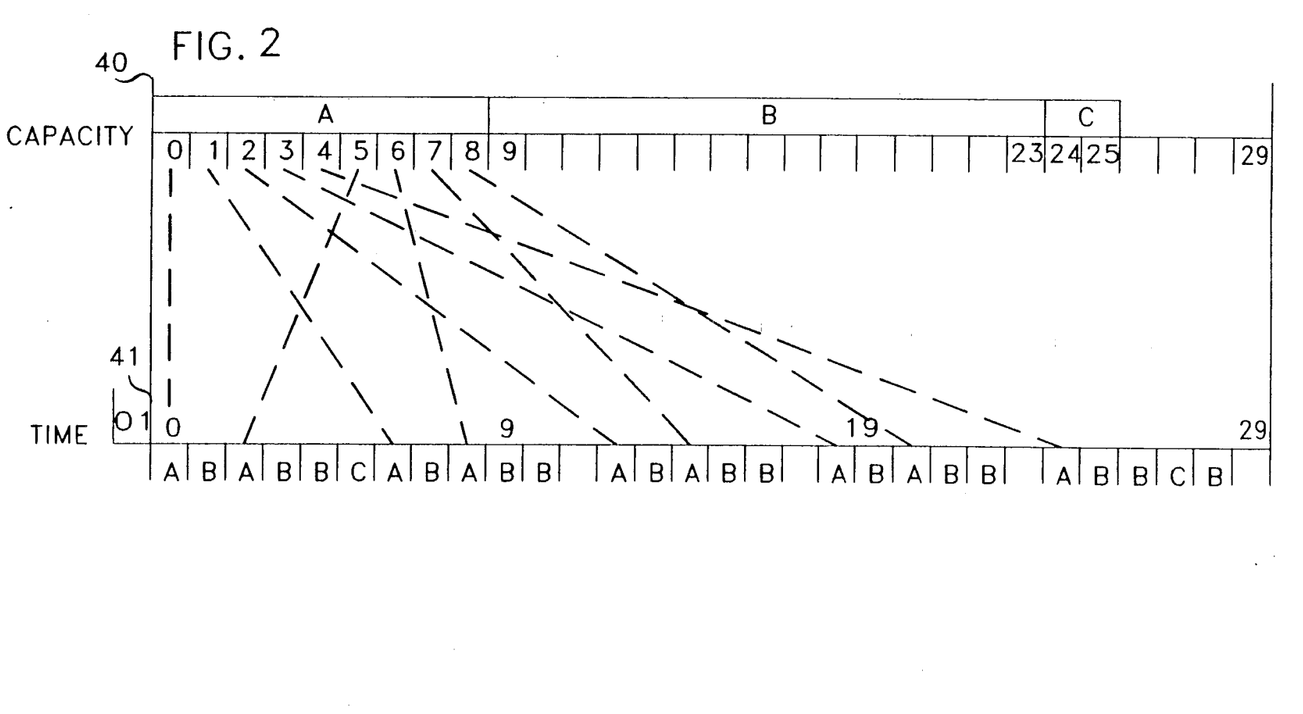
FIG. 2 is an illustration of the mapping of a capacity domain frame into a time domain frame for three exemplary input signals to the arrangement of FIG. 1 using a two-step method in accordance with the present invention.

FIG. 2 illustrates an example of a 2-step digit reversal technique for a system comprising three input data ports $11_1$ to $11_3$ which hereinafter will be designated data ports A-C, respectively. For purposes of description, it will be assumed that the capacity domain includes a capacity frame 40 of 30 sequential capacity domain time slots (CTSs 0-29) with each capacity domain time slot (CTS) representing an exemplary 1 Mb/s of capacity. It will be further assumed that data port A has an 8.8 Mb/s data rate, data port B has a 14.8 Mb/s data rate, and data port C has a 1.9 Mb/s data rate. Since only an integral number of Capacity Time Slots (CTS) can be assigned to a data port, data port A will be assigned 9 CTSs, data port B will be assigned 15 CTSs, and data port C will be assigned 2 CTSs. Individual data ports A-C are assigned a contiguous segment of the capacity domain frame. As shown in FIG. 2 for the capacity domain frame 40, data port A is arbitrarily assigned CTSs 0-8 to accommodate the 8.8 Mb/s capacity requirement, data port B is arbitrarily assigned CTSs 9-23 to accommodate the 14.8 Mb/s capacity requirement, and data port C is arbitrarily assigned CTSs 24-25 to accommodate the 1.9 Mb/s capacity requirement. It is to be understood that data ports A-C could have been assigned any portion of the 0-29 CTSs of the capacity domain frame 40 which did not overlap another data ports requirements.

In accordance with a first step of the present bit reversal technique, the capacity domain CTS address is decomposed as a predetermined number of digits (e.g., 3 digits for the 00-29 CTS) from a set of number bases. More particularly, to determine the number bases to be used, any combination of numbers that, when multiplied together, will provide the number of CTSs of the capacity domain frame 40 can be used. For example, for the 30 CTSs of the capacity domain frame 40, combinations such a 5 and 6; 3 and 10; 2 and 15; and 2, 3 and 5 when multiplied together will yield a value of 30. Although any of these combinations may be used for the following calculations, the following example will use the numbers 2, 3 and 5 since it provides a clearer example of the method. Typically, using a combination with more numbers, e.g. 2, 3 and 5 rather than just 5 and 6, will provide a somewhat more even distribution of the CTSs among the Time Domain Time Slots (TDTS) in Time Capacity frame 41. However, factors of 3 are best combined with other factors rather than separate, to obtain uniformity of distribution. Therefore, for the number systems of 2, 3, and 5 to be used, the range of numbers would be 0-1, 0-2 and 0-4, respectively, as is well known in the art. In decomposing the capacity domain CTS numbers for the exemplary number systems chosen, the first step of the present digit reverse technique uses the equation:

$$X = X_1 \cdot 3 \cdot 5 + X_2 \cdot 5 + X_3 \qquad (1)$$

where X is the CTS address, and $X_1$ to $X_3$ are integers which would be substituted to produce the CTS address X.

Figure 3:
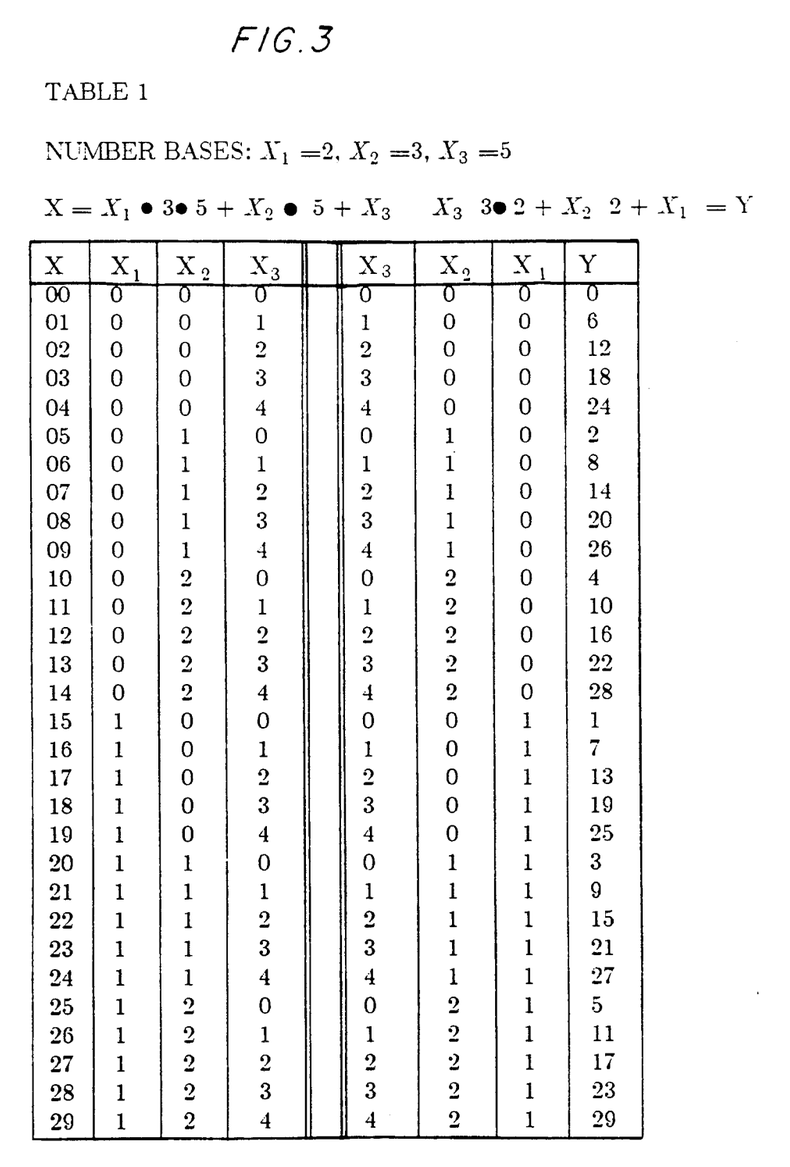
FIG. 3 is a table listing the conversion of the capacity domain to time domain assignments for use in FIG. 3 for the exemplary two-step method in accordance with the present invention.

FIG. 3 shows a Table 1 which illustrates the various values of $X_1$ to $X_3$ which need to be multiplied with the associated data base numbers to produce each of the CTS addresses. For example, for the CTS address where X=00 in frame 40 of FIG. 2 representative of the first CTS of data port A, $X_1$ to $X_3$ would have to equal zero in equation (1) to yield X=00. Similarly, for CTS address X=23 in frame 40 of FIG. 2 representative of the last CTS for data port B, $X_1$ and $X_2$ would have to equal 1 while $X_3$ equals 3 in equation (1) to yield $15+5+3=23$.

Having completed the above first step for each of the used CTSs in capacity domain frame 40, the second step is to generate a digit reverse technique by reversing the number base sequence and $X_i$ values and generate the following equation in the same manner as used for generating equation (1):

$$Y = X_3 \cdot 3 \cdot 2 + X_2 \cdot 2 + X_1 \qquad (2)$$

where Y is the assigned representative time slot in a Time Domain frame 41, comprising 30 time slots, for the CTS of Capacity Domain frame 40 of FIG. 2. For example, for CTS 06 of Capacity Domain 40 assigned to data port A, in accordance with Table 1 of FIG. 2, $X_1$ of equation (1) would equal 0 while $X_2$ and $X_3$ would equal 1 each to produce X=06. Substituting these $X_i$ values into equation (2) would produce Y=08 representative of time slot 08 of time domain frame 41. Therefore, the data in CTS 06 in frame 40 would be transmitted over medium 19 as data in time slot 08 of Time Domain frame 41 using this 2-step digit reverse technique. Similarly, as seen from Table 1 of FIG. 2, the data assigned to CTSs 08 and 23 would be transmitted over medium 19 in time slots 20 and 21, respectively, of time domain frame 41. In this manner the contiguously assigned capacity domain time slots in frame 40 for each of data ports A-C are distributed somewhat uniformly through the time domain frame 41, as are the unused CTSs.

Figure 4:
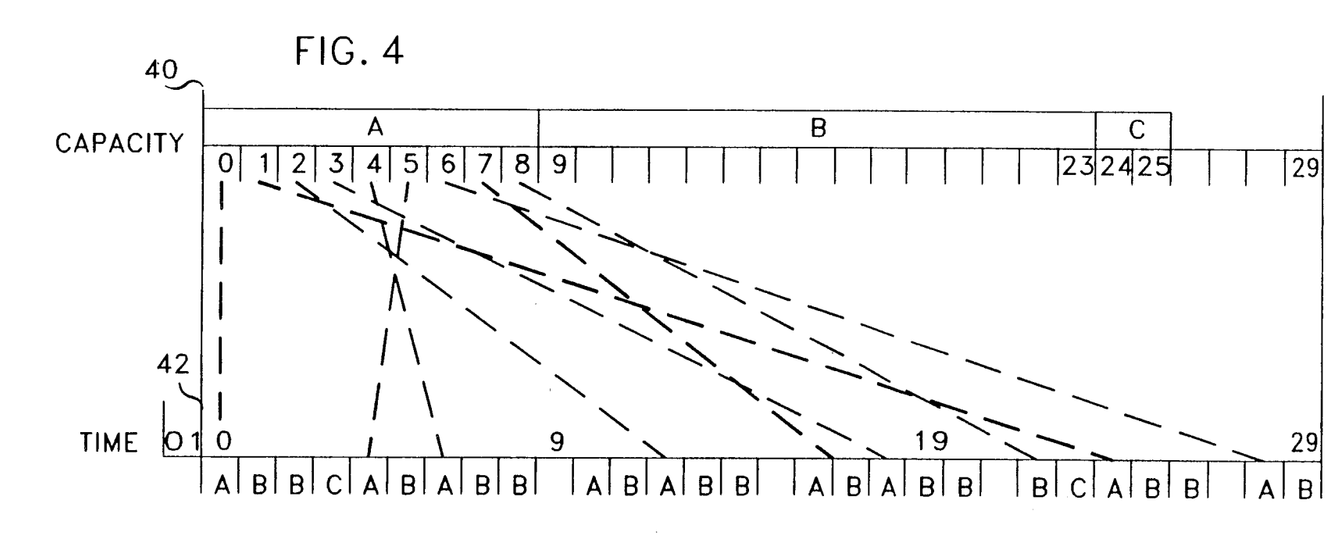
FIG. 4 is an illustration of the mapping of a capacity domain frame into a time domain frame for the three exemplary input signals used in FIG. 3 using a three-step method in accordance with the present invention.
Figure 5:
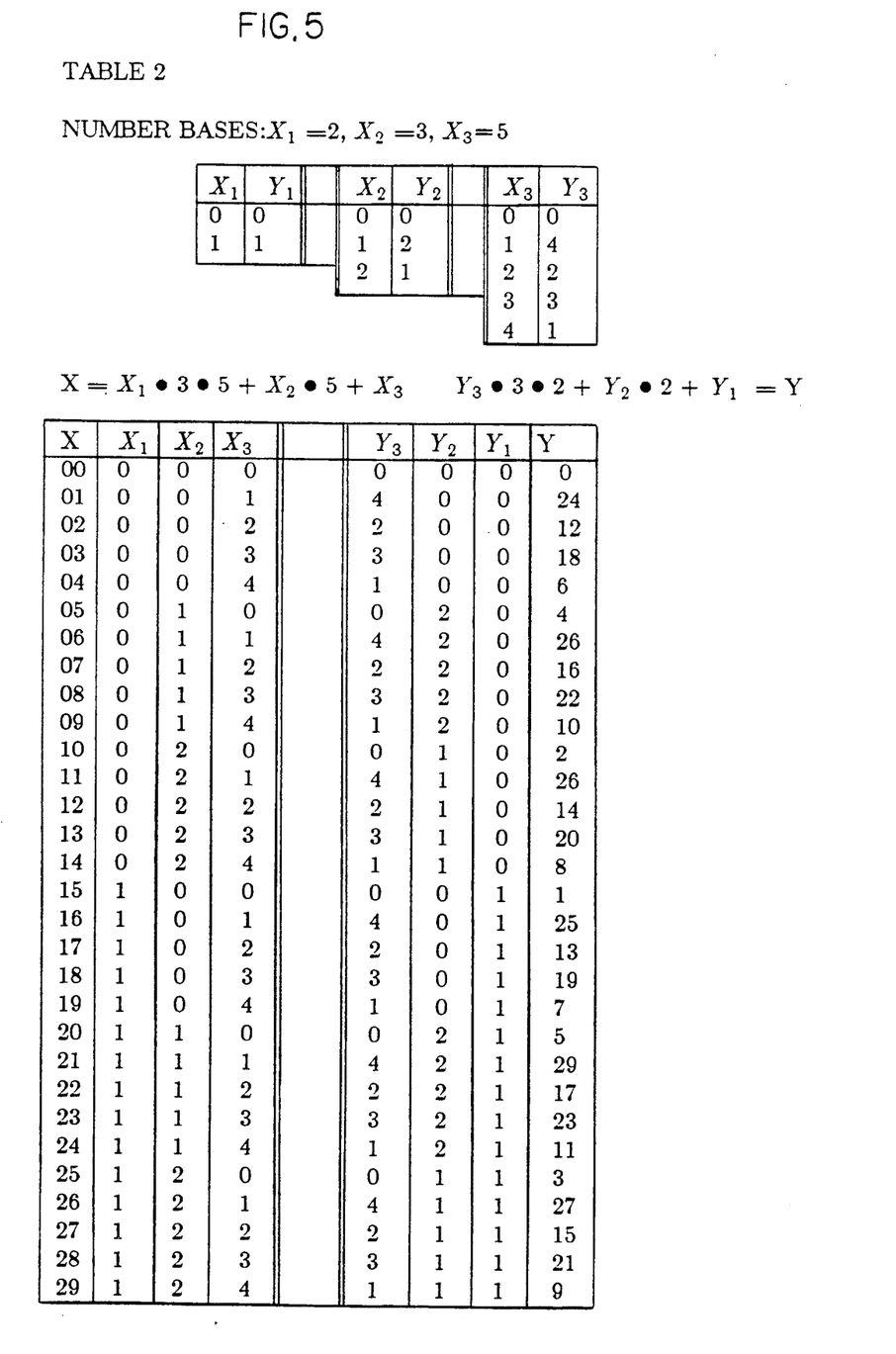
FIG. 5 is a table listing the conversion of the capacity domain to time domain assignments for use in FIG. 5 for the exemplary three-step method in accordance with the present invention.

An alternative 3-step digit reverse technique can be used to provide a more even distribution of the CTSs of capacity domain frame 40 as shown in FIGS. 4 and 5. In this 3-step digit reverse technique the first step of the above-described 2-step technique using equation (1) is repeated as the first step of the 3-step digit reverse technique and is shown again in Table 2 in FIG. 5 for the values of $X_1$ to $X_3$ required for X to equal each of 00-29. A second step of the 3-step digit reverse technique involves the conversion of the determined values of $X_1$ to $X_3$ into equivalent $Y_1$ to $Y_3$ values, respectively, as shown in the smaller subtable at the top of FIG. 5. More particularly the values of 0 and 1 for $X_1$ equate to the values of 0 and 1, respectively, for $Y_1$; the values of 0, 1, and 2 for $X_2$ equate to the values of 0, 2, and 1, respectively, of $Y_2$; and the values of 0, 1, 2, 3, and 4 for $X_3$ equate to the values of 0, 2, 4, 1, and 3, respectively, for $Y_3$.

The digit reverse values shown above were determined through modular arithmetic. For example, the values of $Y_3$ were determined from the equation:

$$Y_3 = X_3 \cdot 2 (\text{mod} 5)$$

where $$2 = \text{integer}[5/2]$$

similarly, $$Y_1 = X_1 \cdot 1 (\text{mod} 2)$$

and $$Y_2 = X_2 \cdot 2 \pmod 3$$

This choice of modular arithmetic to determine the mapping from $X_n$ to $Y_n$ is given for exemplary purposes only, and is not intended to limit the scope of the present invention.

The third step of the 3-step digit reverse technique uses the equation $$Y = Y_3 \cdot 3 \cdot 2 + Y_2 \cdot 2 + Y_1 \qquad (3)$$

which is derived in the same manner as equation (2) but substitutes the $Y_i$ for the $X_i$ values of equation (2). The lower portion of Table 1 shows the calculated values for the assignment of the CTS address for X in capacity domain frame 40 to the time slot address for Y in the time domain frame 42 of FIG. 4. More particularly, CTS 08 and 23 in capacity domain frame 40 are assigned to time domain frame time slots 22 and 23, respectively. When comparing the 2-step and 3-step digit reverse technique shown in FIGS. 2 and 4, the capacity domain TSs of frame 40 will typically be more evenly distributed throughout the time domain frame 42 with the 3-step technique of FIG. 4 than with the 2-step technique of FIG. 2. It is to be understood that such calculations could be extended with further intermediate steps to provide still more evenly distributed capacity domain TSs over the time domain frame, but the 2-step and 3-step techniques are found to provide a sufficiently even distribution of the capacity domain over the time domain to minimize elastic stores in the synchronizers 12 and desynchronizers 27 and minimize phase noise in the output data clock. It is to be understood that the advantage of the present 2-step and 3-step techniques are that the time slots are substantially uniformly distributed within a time domain frame and that all capacity domain TSs are guaranteed to be mapped inside the time domain frame 41 or 42.

Figure 6:
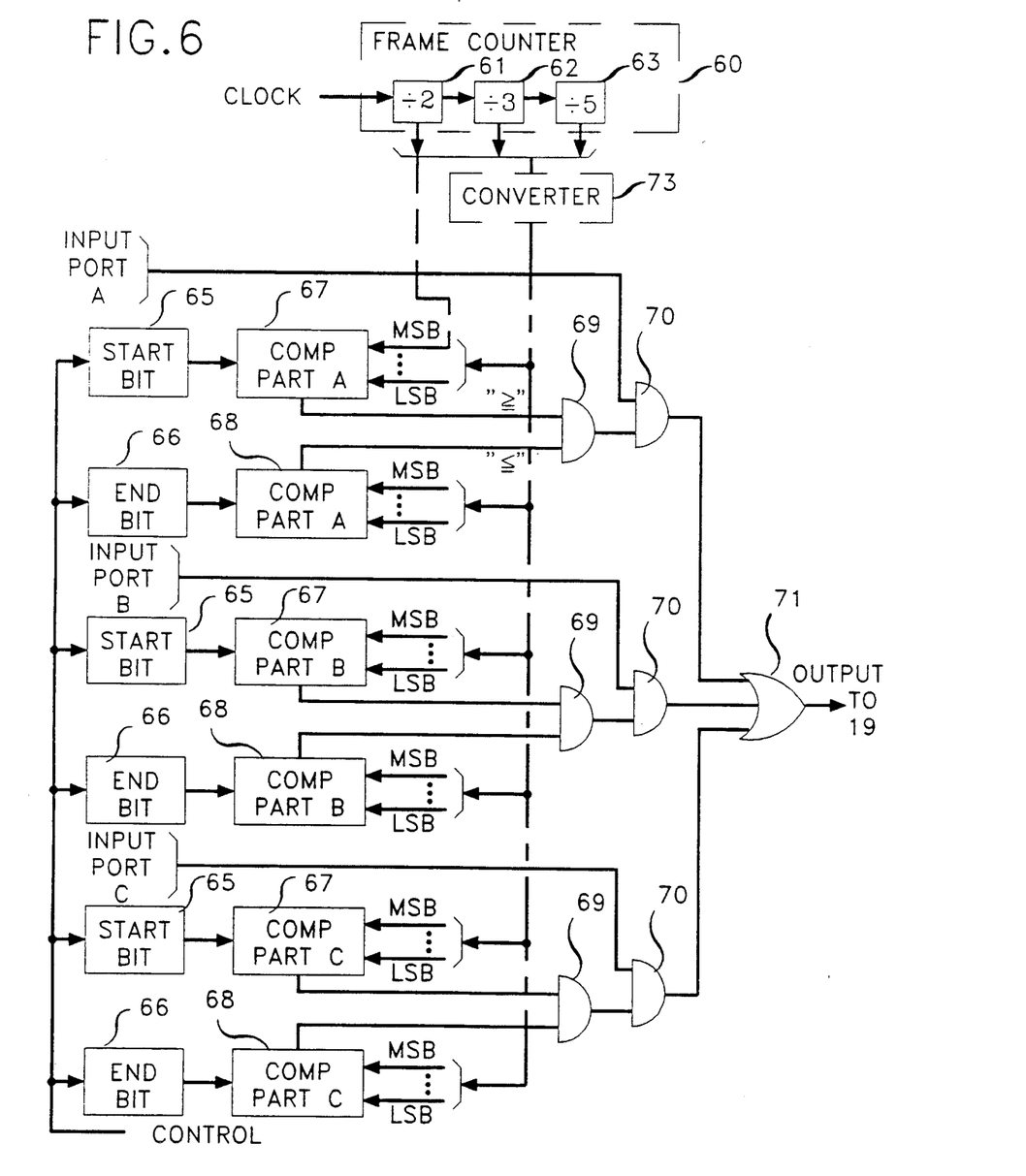
FIG. 6 is a block diagram of a programmable multiplexer in accordance with the present invention.
Figure 7:
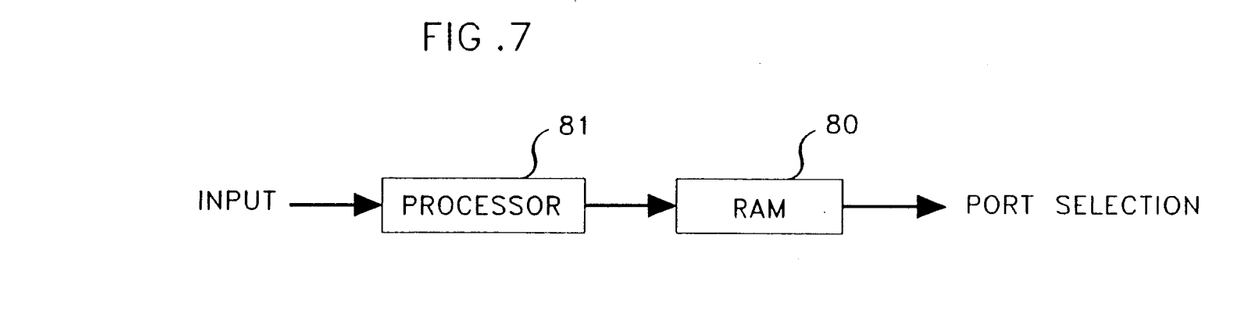
FIG. 7 is a block diagram of an alternative programmable multiplexer in accordance with the present invention.

Exemplary programmable multiplexer 16 arrangements for performing the above 2-step or 3-step techniques are shown in FIGS. 6 and 7. In FIG. 6 a frame counter 60 receives a clock signal which is passed through a plurality of dividing circuits 61–63 that provide binary value outputs relating to the time slot numbers in time domain frames 41 or 42 in FIGS. 2 and 4, respectively. For purposes of explanation, the following description of the PMUX of FIG. 6 will be related to the prior example of a capacity and time domain frame of 30 CTSs, where the number bases 2, 3 and 5 are used. Therefore, frame counter 60 would include a divide-by-2 circuit 61, a divide-by-3 circuit 62, and a divide-by-5 circuit 63. Since the binary output from the divide-by-2 circuit 61 can only be a binary "0" or "1", there will only be a single output lead, while divide-by-3 circuit 62 provides 2 output leads to take care of the possible 00, 01 and 10 binary output codes, and divide-by-5 circuit 63 provides 3 output leads to take care of the possible 000, 001, 010, 011 and 100 binary codes. The output lead from divide-by-2 circuit 61 will be considered as the Least Significant Bit (LSB) while the highest value binary output lead from divide-by-5 circuit 63 is considered the Most Significant Bit (MSB). It should be noted that the LSB-MSB bits from frame counter 60 are coupled to the comparators 67 and 68 of Data Ports A-C in a reverse order, as shown by the exemplary dashed line for the LSB from divide-by-2 circuit 61 to the MSB input for comparator 67 of Data Port A, to automatically produce the bit reversal technique. Each of input ports A-C of FIG. 1 is provided with a Start Bit Memory 65 and an End Bit Memory 66 in PMUX 16 which are coupled to a first associated Comparator 67 and a second associated Comparator 68, respectively. These memories and Comparators are effectively associated with the Capacity Domain frame 40 of FIGS. 2 or 4. Each of first and second Comparators receives the bits on the 6 output leads from frame counter 60 in the reverse order at separate inputs thereof. The outputs from each of the first and second Comparators 67 and 68, associated with each of input Data port A-C, are connected to separate inputs of a separate associated AND gate 69, and the output from each AND gate 69 is connected to a first input of a separate second AND gate 70. The data signal from a synchronizer $12_i$ associated that input Data Port is applied to the second input of the associated AND gate 70. The outputs from the second AND gates 70 are coupled to separate inputs of an OR gate 71, with the output of OR gate 71 being applied to medium 19 for transmission to the far-end receiver.

In operation, a control signal initializes each of the Start Bit memories 65 and End Bit memories 66 for each of the input data ports. In the present example shown in FIGS. 2 or 4, the start and end bit memories 65 and 66 for Data Port A would be set at 00 and 08, respectively, since those are the arbitrarily assigned contiguous CTSs in capacity domain frame 40 for Data Port A. Similarly, the Start and End Bit memories 65 and 66 for Data Port B would be set at 09 and 23, respectively; while the memories 65 and 66 for Data Port C would be set at 24 and 25, respectively. In the present example, when frame counter 60 provides binary signals on its 6 output leads indicating the address of a particular Time Domain Time slot. Each of first comparators 67 compares the associated stored Start Bit value with the bit reverse binary value from frame counter 60 and outputs a binary "1" if the binary value from frame counter 60 is equal to or greater than the associated Start Bit value, and a "0" if the binary value from frame counter 60 is less than the stored Start Bit. Similarly, each of second comparators 68 compares the associated stored End Bit value with the binary values from frame counter 60 and outputs a binary "1" if the associated End Bit value is equal to or greater than the received binary value from frame counter 60, and a binary "0" if the associated End Bit value is less than the binary value received from frame counter 60.

Therefore, for the period of time of time domain time slot 06, frame counter 60 would output the equivalent binary value for 1,0,0 for $X_3$ to $X_1$ as shown for $Y = 06$ in table 1 of FIG. 3. Each of comparators 67 for Data Ports A-C would receive the reverse value of 0,0,1 from frame counter 60, because of the lead reversal between frame counter 60 and comparators 67 and 68, and compare the stored Start Bit value of associated memory 65 with the received reverse binary code. Only comparator 67 for Data Port A would output a binary "1" since this comparator would find it equal to or greater than the stored Start Bit value of 00 in associated Start Bit memory 65. The remaining two comparators 67 for Data Ports B and C would determine that the received reverse binary code is less than the stored Start Bit value and, therefore, output a binary "0". However, for comparators 68 of Data Ports A-C, each of comparator 68 associated with Data Ports A-C would output a binary "1" since the received reverse binary code 001 (equal to digit 1) is less than the End Bit value stored in each of the End Bit memories 66. Therefore, only AND gate 69 associated with Data Port A would produce a binary "1" enable output signal during time domain frame time slot 06 because both of its inputs equal a binary "1". This enable output signal from AND gate 69 of Data Port A provides a binary "1" enable signal to AND gate 70 for Data Port A and permits the input data signal from Data Port A to pass therethrough and to OR gate 71 for transmission via medium 19. A similar process occurs for each of the time domain time slots for Y=00-29 in Table A to permit the appropriate Data Port to be accessed in accordance with the capacity domain during each of the Time Domain Time Slots.

To permit the 3-step technique to be performed, an optional converter 73 need only be disposed at the output of frame counter 60 to perform the conversion for the number base values from $X_1$ to $X_3$ to $Y_1$ to $Y_3$, respectively, as shown in the top portion of Table 2 in FIG. 5.

FIG. 7 illustrates an exemplary alternative preferred arrangement for performing the 2-step or 3-step digit reverse technique, in which the capacity domain parameters are provided to a processor 81, such as a personal or other computer or microcomputer, and processor 81 performs the appropriate 2-step or 3-step capacity domain to time domain calculations. The results are then stored in a RAM 80 and used in a table look-up manner to multiplex the input Data Port A-C signals onto medium 19 in the manner shown in FIGS. 2 and 4.

It is to be understood that the PDEMUX 23 and desynchronizers 27 at the receiving end operate in the reverse manner from synchronizers 12 and PMUX 16 at the transmitting end to recover the input data signals and transmit them to the appropriate end user devices.

It is to be understood that other modifications can be made to the arrangements described hereinbefore and still fall within the spirit and scope of the present invention. For example, it is possible to perform the function of synchronizers 12 in PMUX 16 by including additional input ports beyond inputs A and B to PMUX 16 which provide stuff indicator bits. The last CTS allocated to a particular data port could then be used for pulse stuffing, with the stuff indicator bits in the previous frame indicating whether or not the data in that CTS was valid.

We claim:

1. A method of multiplexing a one or more input data signals, including individual data rates, from an input capacity domain frame into an output time domain frame and transmitting the multiplexed data signals, the method comprising the steps of:
   (a) assigning each of the input data signals to one or more predetermined contiguous addresses of the capacity domain frame dependent on the input data rate, where the capacity domain frame and the time domain frame each include a predetermined number of addresses which can be assigned;
   (b) counting through the time domain frame in a predetermined sequence from a first to a last address of a counting sequence, the counting sequence being represented by a multibit word, including N individual segments;
   (c) generating N binary words, each word containing one or more bits, each word associated with one of the N segments of step (b);
   (d) comparing the multibit words from step (c) in a reverse order with a first and a second number defining the start and stop address, respectively, of the contiguous addresses in the capacity domain assigned in step (a) to each of the input data signals, for assigning which one of the one or more input data signals will be assigned to each address of the time domain frame; and
   (e) transmitting sections of each of the input data signals during the addresses of the time domain frame sequence as determined in step (d) to a remote one or more receivers for recovery of each data signal.

2. The method according to claim 1, wherein in performing step (b), performing the substeps of
   (b1) converting the predetermined number of addresses in the capacity domain frame into a plurality of number bases which when multipled together yield said predetermined number of addresses in the capacity domain frame; and
   (b2) translating each of the addresses of the capacity domain frame into a binary word for each of the number bases determined in step (b1).

3. The method according to claim 2 wherein in performing step (d), using the number bases in reverse order from that of step (b1) and the binary words from step (b2) in a reverse order for assigning each time domain frame address to a particular one of the one or more data input signals.

4. The method according to claim 1, 2, or 3, wherein the method comprises the further step of:
   (f) prior to performing step (d), performing a modular arithmetic multiplication of each of the binary words generated in step (c) for each of the N counting stages to generate a set of second binary words for use in step (d).

5. A method of combining a plurality of input data signals to form a multiplexed data signal, each of said input data signals having an associated data rate, comprising the steps of
   (a) assigning one or more predetermined capacity segments to each of said input data signals, the number of capacity segments assigned to each data signal being determined by the associated data rate;
   (b) associating each of said capacity segments with a particular time slot in each time frame of a series of time frames; and
   (c) transmitting sections of each of the input data signals during the associated time slot;
   wherein said associating step includes
      (1) associating an address in a contiguous series of addresses with each of said capacity segments;
      (2) generating a multibit bit binary word by combining the values of N separate words, (3) reversing said binary word; and (4) associating each of said addresses with each of said time slots as a function of said reversed binary word.

6. The invention defined in claim 1 wherein the value of each of said N separate words is computed in a number base such that the product of said number bases equals the number of time slots in each of said time frames.

7. A method of multiplexing a plurality of input data signals having individual data rates, into a frame of an output time multiplexed data signal, the method comprising the steps of
   (a) assigning to each of the input data signals one or more predetermined contiguous addresses dependent on the input data rate, where the number of addresses which can be assigned is fixed;

(b) forming a multibit word having bits from N groups of bits, each of said N groups having a mathematical significance in a range from least significant to most significant, said word having a binary value formed by counting in a predetermined sequence, (c) comparing the binary value of said multibit word in a reverse order of significance, with a first and second number defining the start and stop address, respectively, of the contiguous addresses assigned in step (a) to each of the input data signals so as to assign sections of each one of the input signals to a different time slot in each of said frames of the time multiplexed data signal, and (d) transmitting sections of each of said input data signals during the time slot determined in step (c) to one or more remote receivers for recovery of each of said data signals.

8. A method of multiplexing a plurality of input data signals to form a combined data signal, each of said input data signals having an associated data rate, comprising the steps of (a) assigning one or more predetermined capacity segments to each of said input data signals, wherein the number of capacity segments assigned to each data signal is determined by the associated data rate of that data signal;

(b) associating each of said capacity segments with a particular time slot in each time frame of a series of time frames, each of said time frames including a total of M time slots each having an address; and (c) transmitting sections of each of the input data signals during the associated time slot;

wherein said associating step includes (1) assigning an address in a contiguous series of addresses to each of said capacity segments; (2) generating a binary number sequence that repeats after M iterations; (3) translating each of said assigned capacity segment addresses to a corresponding time slot address as a function of a permutation of said binary number sequence.

9. A method of combining a plurality of input data signals having individual data rates, into an output time multiplexed data signal, the method comprising the steps of (a) assigning to each frame of each of the input data signals one or more predetermined contiguous addresses dependent on the input data rate;

(b) forming an M bit word having a binary value formed by counting in a predetermined sequence, (c) comparing the binary value of said M bit word in a reverse order with first and second numbers defining the start and stop addresses, respectively, of the contiguous addresses assigned in the assigning step, so as to assign each one of the input signals to a different time slot in each of said frames of the time multiplexed data signal, and (d) transmitting sections of each of said input data signals during the time slot determined in the comparing step to one or more remote receivers for recovery of each of said data signals.

10. Apparatus for multiplexing a plurality of input data signals having individual data rates, into time slots in a frame of an output time multiplexed data signal, comprising (a) means for assigning addresses representing the starting and ending points of a capacity segment to each of said input data signals;

(b) means for forming a multibit word having bits from N groups of bits, each of said N groups havings a mathematical significance in a range from least significant to most significant, said word having a binary value formed by counting in a predetermined sequence, (c) means for comparing said multibit word in a reverse order of significance, with said assigned addresses so as to select sections of each one of the input signals; and (d) means for transmitting said selected sections of each of said input data signals during a different time slot to one or more remote receivers for recovery of each of said data signals.

11. Apparatus for multiplexing a plurality of input data signals having individual data rates, into time slots in a frame of an output time multiplexed data signal, comprising (a) a plurality of comparators arranged to produce an output in response to the relative values of first and second inputs;

(b) means for applying a first signal to each first input of each of said comparators, the value of said first signal representing a capacity segment assigned to a particular one of said input data signals;

(c) means for applying a second signal to each second input of each of said comparators, said second signal having a value representing a number in a permuted number sequence that repeats after M iterations; and (d) means for inserting data from a selected one of said data signals into particular ones of said time slots in response to the outputs of said comparators.

* * * * *